F. L. RAPSON.
LIFTING JACK AND THE LIKE FOR USE ON MOTOR ROAD AND OTHER VEHICLES.
APPLICATION FILED JUNE 30, 1917.

1,322,947.

Patented Nov. 25, 1919.
4 SHEETS—SHEET 1.

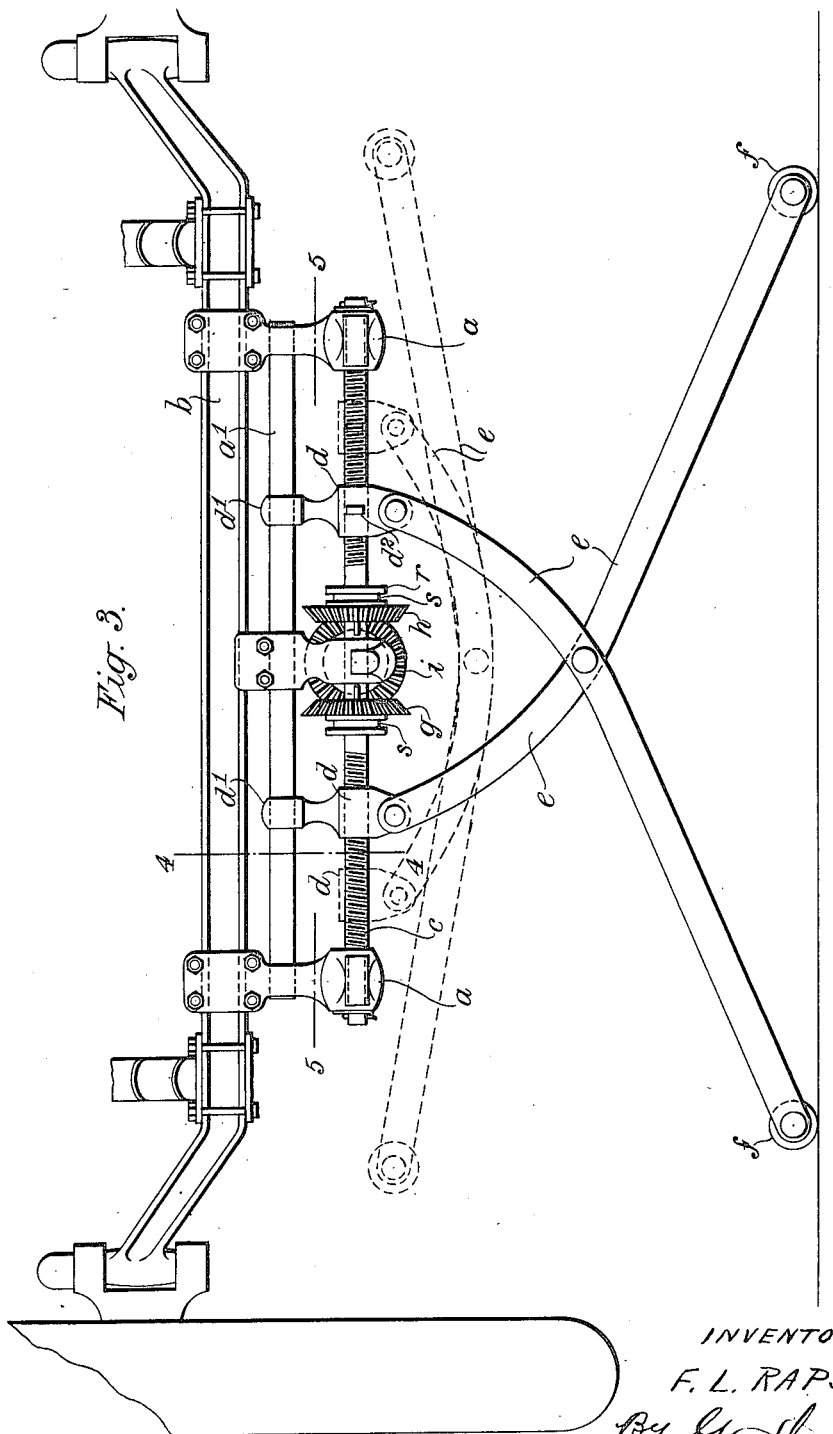

F. L. RAPSON.
LIFTING JACK AND THE LIKE FOR USE ON MOTOR ROAD AND OTHER VEHICLES.
APPLICATION FILED JUNE 30, 1917.
1,322,947.
Patented Nov. 25, 1919.
4 SHEETS—SHEET 4.
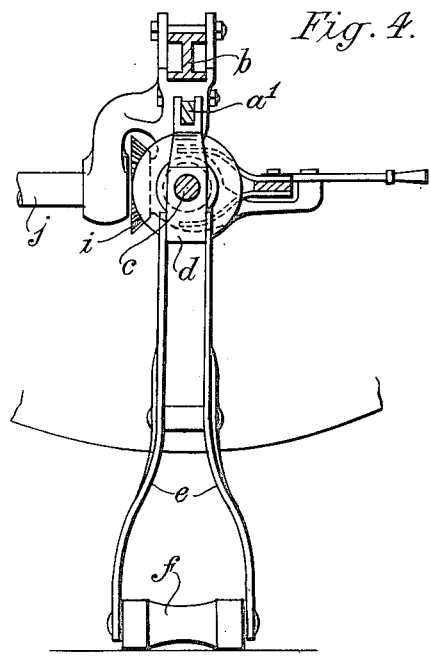
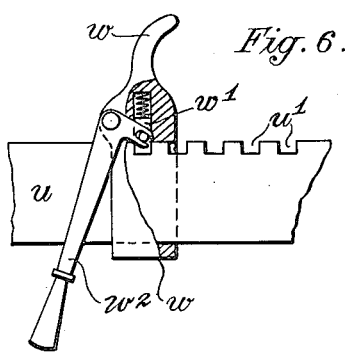
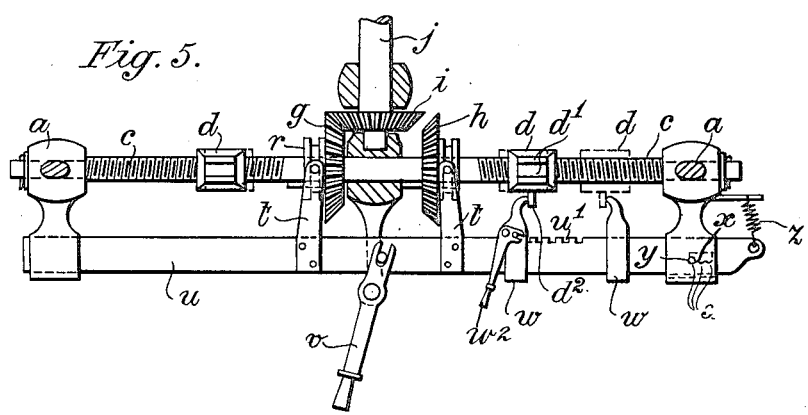
INVENTOR
F. L. RAPSON

UNITED STATES PATENT OFFICE.

FREDERICK LIONEL RAPSON, OF LIVERPOOL, ENGLAND.

LIFTING-JACK AND THE LIKE FOR USE ON MOTOR ROAD AND OTHER VEHICLES.

1,322,947.　　　　　Specification of Letters Patent.　　Patented Nov. 25, 1919.

Application filed June 30, 1917. Serial No. 178,034.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks and the like for Use on Motor Road and other Vehicles, of which the following is a specification.

This invention relates to improvements in lifting jacks and the like for use on motor road and other vehicles.

The invention has for its object to provide on a motor road vehicle such as a motor car, means for lifting the car from the ground which means are adapted to be actuated by the engine of the car or by other means so that the weight of the car can be taken off the wheels to relieve the tires when in the garage, or to jack the car up when it is desired to repair punctures or effect other repairs, or to raise the car for washing or inspection purposes.

A further object is to provide under the chassis of the vehicle one or more jacks which will automatically raise or lower the car to any predetermined height in considerably less time than it would take to get the ordinary hand jack from the car.

A still further object is to so construct the lifting means that the weight of the car will be distributed over a large area and be stronger and quicker in action; higher when in raised position and occupy a small space when in its inoperative position.

With these and other objects in view the invention consists in providing adjacent to the front and rear axles or other convenient part of the chassis, one or more pairs of pivoted or scissor like levers, the upper ends of which are adapted to be moved closer together or farther apart by rotatably mounted right and left handed screw threaded rods driven from the engine or by other suitable means, such as a hand wheel, so that the lower ends of the said levers will engage the ground and raise the vehicle when moved in one direction, or draw the lower ends of the levers up and out of action when moved in the opposite direction.

The invention also consists in providing means to automatically control the movement of the lifting levers or jacks so that the car can be raised or lowered to any predetermined distance.

I will now describe one form of my invention with reference to the accompanying drawings in which:—

Fig. 3 is an end view to an enlarged scale showing the car in its raised position with the operating mechanism out of gear, the sliding bar being removed for clearness;

Fig. 4 is a section on the line 4—4 of Fig. 3;

Fig. 5 is a sectional plan on the line 5—5 of Fig. 3 but showing the operating mechanism about to be disengaged;

Fig. 6 is a detail partly in section of one of the adjustable strikers.

As shown I rotatably mount in suitable bearings $a$ on or adjacent to each axle $b$ a rod $c$ which is formed with a right hand threaded screw at one end and a left hand threaded screw at the other end. Upon each of these threaded portions of the rod $c$ is adapted to ride a threaded sleeve $d$ which sleeves $d$ are connected to the upper ends of one or more pairs of pivoted or scissor like levers $e$. If desired, each of the threaded rods $c$ may be secured to the axle or other convenient part of the chassis through the medium of bars or a bar $a'$ arranged parallel above the said rod $c$ and the threaded sleeves $d$ may be provided or formed with upwardly disposed forked extensions or guides $d'$ to engage the bar $a'$ and slide thereon and thus keep the levers $e$ in a vertical position. To the outer and lower ends of these pivoted levers $e$ are mounted wheels $f$, skates or other suitable means to engage the ground. Upon each rod $c$ and preferably intermediately of the threaded portion are slidably mounted two bevel wheels $g$ and $h$ which are adapted to engage, when in their operative position, a bevel wheel $i$ secured on each end of a shaft $j$ longitudinally disposed under the chassis $k$ of the car so that the front and the rear threaded rods $c$, can be connected as desired to this shaft $j$ to rotate in either direction. This longitudinal shaft $j$ is adapted to be driven from the shaft $l$ or the shaft $m$ by suitable gearing or other convenient means, preferably by a chain $n$ and sprocket wheels $o$. Adjacent to the driver's seat is fitted a lever $p$ or the like which is connected by any suitable means, to a clutch $q$, or the like so that upon the operation of this lever $p$ the longitudinal shaft $j$ can be driven by the engine. This clutch or the like $q$ may be provided on the engine or the "Cardan" shaft or on the longitudinal shaft $j$ as desired.

Any convenient means may be employed to connect up the threaded rods $c$ with the longitudinal shaft $j$ so that they may be driven thereby in either direction to raise or lower the pivoted levers $e$, but I preferably employ the bevel wheels, previously mentioned. The bevel wheels $g$ and $h$ slidably mounted on the threaded shafts $c$, but capable of rotating them when placed in mesh with the bevel wheels $i$ on the longitudinal shaft $j$, are each formed or provided with a sleeve or collar $r$ having a circumferential groove or recess $s$.

Within each of these recesses $s$ is disposed the forked ends of fingers $t$ which are rigidly secured to a bar $u$ slidably mounted in suitable bearings in front of each of the said threaded rods $c$. Each of these bars $u$ is adapted to be moved in one direction or the other by a suitably pivoted hand lever $v$ so that one of the bevel wheels $g$ or $h$ is adapted to be moved into engagement with the bevel wheel $i$ on the end of the longitudinal shaft $j$ and be driven thereby.

Figure 1:
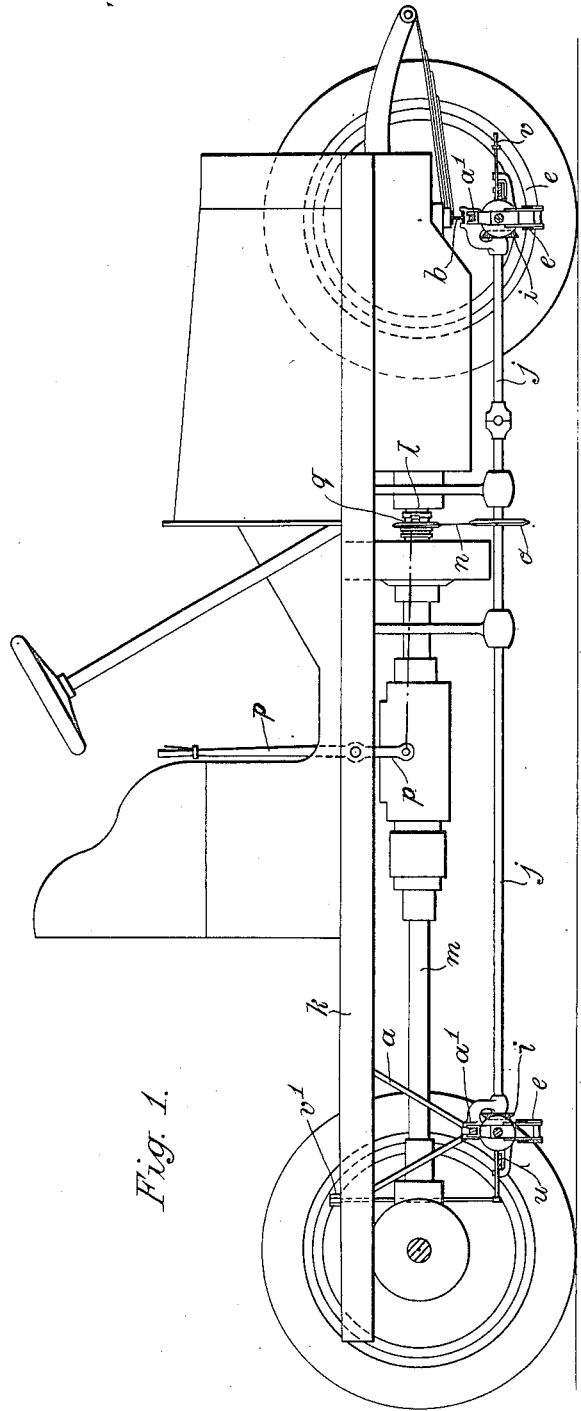
Figure 1 is a sectional side elevation of a car fitted with my improved jack partly in section and in its raised or inoperative position.
Figure 2:
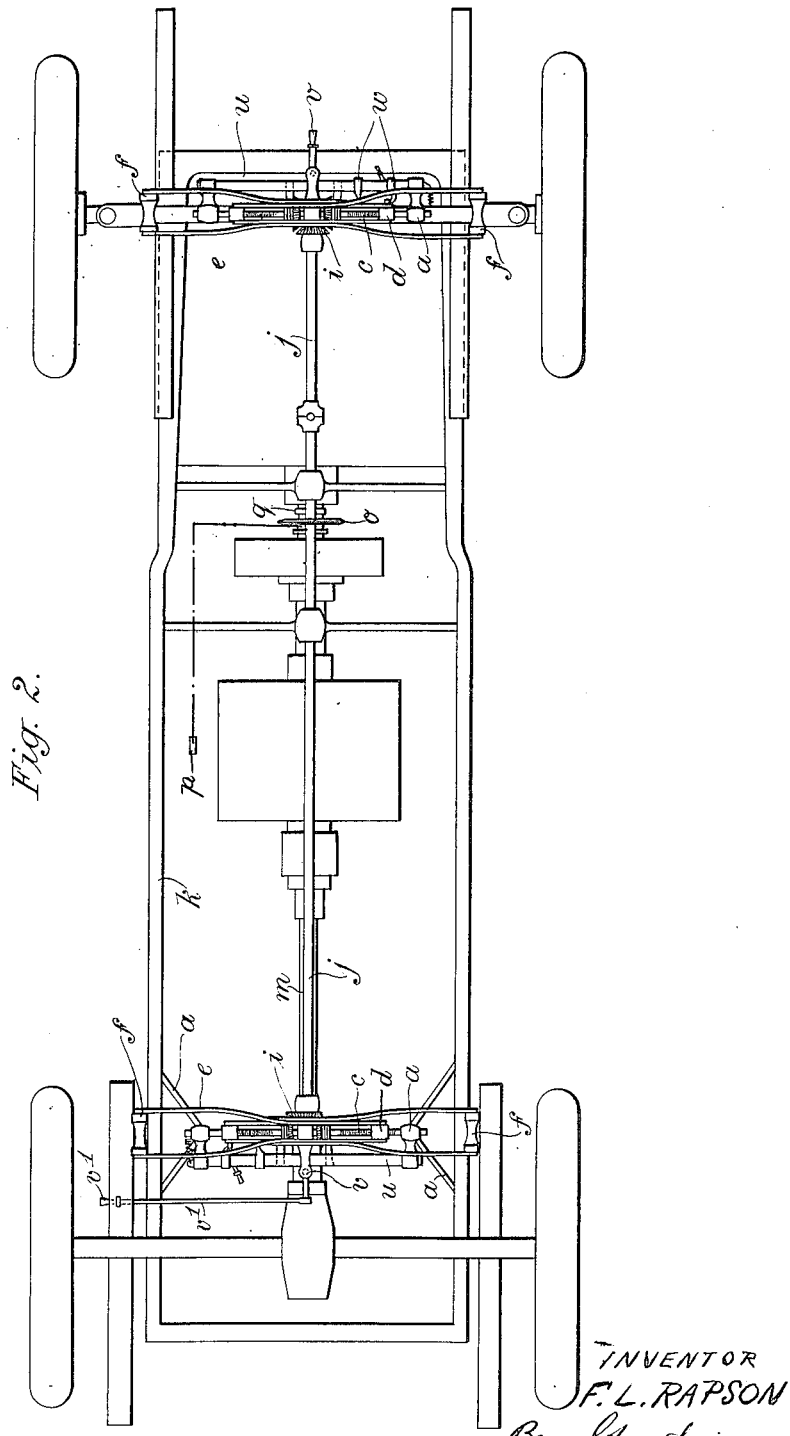
Fig. 2 is an inverted plan thereof.

In Fig. 2 of the drawings the rear jack $e$ is shown adjacent to the rear axle $b$ and carried by a bar $a'$ which in turn is carried by the brackets $a$ from the chassis $k$; the hand lever $v$ can in this case be operated from the side of the car by an extension $v'$ connected to the said handle.

It will thus be seen that one or the other of the bevel wheels on each of the threaded shafts $c$ can be driven by the bevel wheel $i$ on the adjacent end of the longitudinal shaft $j$, and that the threaded shafts $c$ will be rotated in one direction or the other according to which bevel wheel is moved to engage the intermediate bevel wheel $i$ on the end of the longitudinal shaft $j$.

Each slidable bar $u$ is also fitted with a pair of strikers $w$ which are adapted to be engaged by one of the threaded sleeves $d$ so that when one of these strikers $w$ is engaged preferably by a projection $d^2$ on the threaded sleeve $d$ as shown in Fig. 5, the slidable bar $u$ will be moved sidewise and automatically place the engaged bevel wheel $g$ out of engagement with the bevel wheel $i$ on the longitudinal shaft $j$. Thus the movement of these sleeves $d$ and the pivoted jack levers $e$ can be automatically regulated. If desired, one or both of the strikers $w$ could be made adjustable on each slidable bar $u$ so that the levers $e$ could be extended and contracted to a predetermined degree. One convenient method of making the striker $w$ adjustable is to slidably mount the striker on the slidable bar $u$ and provide a spring pressed bolt $w'$ to engage in teeth $u'$ cut in the side of the said bar $u$, a suitable hand lever $w^2$ being provided on the striker to draw back the bolt $w'$ so that the striker $w$ can be moved to the desired position. The slidable bar $u$ is also provided with a slot $x$ having three recesses $x'$ into any one of which a stop $y$ is adapted to be engaged, a suitable spring $z$ being provided to normally hold the stop engaged in one of the recesses $x'$. Thus when the stop is in the middle recess the slidable bar $u$ and the gears are in their inoperative position and the outer recesses will limit the movement of the bar $u$ in either direction.

In operation, and in the event of a puncture, the car is first stopped and the lever $p$ by the driver's seat is operated to clutch up the longitudinal shaft $j$ to the engine so as to be driven thereby. The driver now leaves his seat and operates the lever $v$ at the back or at the front of the car to move the sliding bar $u$ so as to place the slidable bevel wheels $g$ in gear. The operation for instance, of the front hand lever $v$ will cause the front threaded rod $c$ to be rotated in one direction and the threaded sleeves $d$ thereon will move inwardly toward each other. This action will move the upper ends of the scissor like levers $e$ toward each other so that the lower ends $f$ will contact with the ground and thereby raise the car therefrom. When the desired height is reached predetermined by the position of the striker $w$ on the slidable bar $u$, the projection $d^2$ on the threaded sleeve $d$ engages the striker $w$ and slides the bar $u$ sidewise to withdraw the bevel wheel $g$ out of mesh with the bevel wheel $i$ on the longitudinal shaft $j$ and so stop the movement of the jacks $e$. The engine can now be stopped if so desired, and the puncture attended to. When the tire is repaired, the engine is again started and the hand lever $v$ on the front of the vehicle is moved in the other direction to move the bevel wheel $h$ in engagement with the bevel wheel $i$ on the forward end of the longitudinal shaft $j$. Thus the threaded rod $c$ will be rotated in the opposite direction and draw up or fold the levers $e$, as indicated by the dotted lines in Fig. 3. When the right hand sleeve $d$ reaches the predetermined point in its outward movement it engages the outermost striker $w$ and moves it and the bar $u$ to the right, thereby disengaging the bevel wheel $h$ from the bevel wheel $i$ and causing the bevel wheels $g$ and $h$ to assume a neutral position with reference to the bevel wheel $i$. It will be seen that the rear of the car can be raised in a similar manner independently of the front of the car or that both the front and rear wheels can be lifted clear of the ground to any predetermined height.

If desired, the threaded rods $c$ could be operated by one or more hand wheels or the like instead of by the engine. Suitable covers, of leather or other suitable material, may be provided to protect the working parts and prevent them being splashed by mud.

Thus it will be seen that by the above described means the front, rear, or the whole of the car can be mechanically raised clear of the ground without any strain on the chassis which is caused when hand jacks are used to tilt the car and raise one wheel only. Also the car when raised can be easily moved sidewise on the wheels at the end of the levers.

It will also be seen that the controlling mechanism of my improved jack is rendered fool-proof; for instance, should the control lever $p$ for operating the longitudinal shaft $j$ be moved in mistake while the car is running, the mechanism for operating the jack or jacks is out of gear until the driver leaves his seat and actuates the lever $v$ at the front or at the rear of the car.

What I claim is:—

1. In a vehicle, an axle, a rod supported from the axle and having its end portions reversely threaded, a guide bar interposed between the axle and rod, sleeves mounted on the reversely threaded portions of the rod and having connection with the guide rod, levers operatively connected together and having operative connection with said sleeves, and means for rotating the reversely threaded rod in opposite directions to actuate said levers to throw the latter into and out of engagement with the ground.

2. In a vehicle, an axle, a rod supported from the axle and having its end portions reversely threaded, means for rotating said rod, a guide bar interposed between the axle and rod, sleeves mounted on the reversely threaded portions of the rod and having connection with the guide rod, levers operatively connected together and having operative connection with said sleeves, a shiftable bar having operative connection with the means for rotating said rod, and means carried by the last mentioned bar actuated by one of said sleeves to throw the rotating means out of operation.

3. In a vehicle, two levers crossed and pivoted at the point of crossing with the lower ends adapted to engage and run upon the ground, a rod having its end portions reversely threaded, members mounted upon the reversely threaded end portions of the rod and having the upper ends of the crossed levers pivoted thereto, bevel gears splined upon the rod, a drive gear intermediate the bevel gears, a bar having connection with the said bevel gears to effect a shifting thereof, and means mounted upon the said bar to be engaged by one of the members mounted on the reversely threaded rod to throw the bevel gears into neutral position.

4. In a vehicle, two levers crossed and pivoted at the point of crossing with the lower ends adapted to engage and run upon the ground, a rod having its end portions reversely threaded, members mounted upon the reversely threaded end portions of the rod and having the upper ends of the crossed levers pivoted thereto, bevel gears splined upon the rod, a drive gear intermediate the bevel gears, a bar having connection with the said bevel gears to effect a shifting thereof, and strikers mounted upon the said bar to be engaged by one of the members mounted upon the said reversely threaded rod, one of said strikers being adjustable.

5. In a vehicle, oppositely disposed bars, a rod mounted in the bars and having its end portions reversely threaded, sleeves mounted upon the reversely threaded end portions of the rod, a bar mounted in said bearings and engaging the upper ends of the sleeves, levers crossed and pivoted at their point of crossing and having their upper ends pivoted to said sleeves and their lower ends adapted to engage and run upon the ground, bevel gears splined upon the said reversely threaded rod, a drive gear intermediate the bevel gears, a longitudinally movable bar mounted in said bearings and having connection with the bevel gears, means for shifting the last mentioned bar longitudinally, and means mounted upon said bar and adapted to be engaged by one of the sleeves to throw the bevel gears into neutral position.

6. In a vehicle, a rod rotatably supported by the vehicle and having portions reversely threaded, members mounted upon the reversely threaded portions of the rod for movement thereon upon rotation of the rod, vehicle elevating and supporting members operatively connected to the aforesaid members, means to rotate said rod to move the first mentioned members on said rod and thereby actuate said elevating and supporting members to shift the latter into and out of engagement with the ground to raise and lower the vehicle, a shiftable member mounted upon the vehicle, and an element operatively connected to the shiftable member and actuated by one of said sleeves to throw the rod rotating means out of operation.

7. In a vehicle, a rod rotatably supported by the vehicle and having portions reversely threaded, members mounted upon the reversely threaded portions of the rod for movement thereon upon rotation of the rod, vehicle elevating and supporting members operatively connected to the aforesaid members, means to rotate said rod to move the first mentioned members on said rod and thereby actuate said elevating and supporting members to shift the latter into and out of engagement with the ground to raise and lower the vehicle, a shiftable member mounted upon the vehicle, and an operative connection between the shiftable member and one of said sleeves to throw the rod rotating means out of operation at a predetermined time.

8. In a vehicle, a rod rotatably supported by the vehicle and having portions reversely threaded, means to rotate said rod, members mounted upon the reversely threaded portions of said rod for movement thereon upon rotation of the rod, vehicle elevating and supporting levers pivotally connected to the aforesaid members, each lever being composed of spaced members connected together, rollers journaled in the free ends of the members of each lever and adapted to engage the ground and move along the ground toward and away from each other to raise and lower the vehicle upon movement of the aforesaid members of the levers under the influence of rotation of said rods, and means to rotate said rods.

9. In a vehicle, a rod rotatably supported by the vehicle and having portions reversely threaded, members mounted upon the reversely threaded portions of said rod for movement thereon upon rotation of the rod, vehicle elevating and supporting levers pivotally connected to the aforesaid members and having free ends adapted to engage the ground at spaced points and move over the ground toward and away from each other to raise and lower the vehicle upon movement of the aforesaid members under the influence of rotation of said rod, means to rotate said rod, and means to automatically throw the rod rotating means out of operation.

10. In a vehicle, a rod rotatably supported by the vehicle and having portions reversely threaded, members mounted upon the reversely threaded portions of said rod for movement thereon upon rotation of the rod, vehicle elevating and supporting levers pivotally connected to the aforesaid members and having free ends adapted to engage the ground at spaced points and move over the ground toward and away from each other to raise and lower the vehicle upon movement of the aforesaid members under the influence of rotation of said rod, means to rotate said rod, and means to automatically throw the rod rotating means out of operation at a predetermined point of movement of one of said sleeves.

11. In a vehicle, a rod rotatably supported by the vehicle and having portions reversely threaded, members mounted upon the reversely threaded portions of the rod for movement thereon upon rotation of the rod, vehicle elevating and supporting means operatively connected to the aforesaid members and normally carried in an elevated position under the vehicle, means to rotate the rod to move said members and lower the elevating and supporting means into engagement with the ground to raise the vehicle, and means to throw the rod operating means out of operation upon a predetermined movement of one of the aforesaid members.

12. In a vehicle, two levers crossed and pivoted at the point of crossing, the lower ends of said levers adapted to engage and run over the ground, a rod rotatably carried by the vehicle and having reversely threaded portions, members mounted upon the reversely threaded portions of the rod and pivotally connected to the upper ends of said levers, means to prevent rotation of said members, means to rotate said rod in opposite directions to draw the lower ends of said levers toward and away from each other over the ground to raise and lower the vehicle, a shiftable bar, and an operative means between said bar and one of said members and actuated by the latter to throw the rod rotating means out of operation.

13. In a vehicle, means carried by the vehicle normally suspended under the vehicle above the ground and adapted to be lowered into engagement with the ground, means to lower the aforesaid means and raise the vehicle, means independent of the second mentioned means to arrest operation of the latter when the vehicle has been raised to a predetermined degree, and means whereby the lowering means may be operated subsequent to the operation of arresting means to actuate and reverse the direction of movement of said lowering means to raise the first mentioned means off of the ground and thereby lower the vehicle.

14. In a vehicle, elevating and raising means connected to the body of the vehicle and operable to raise and lower the vehicle from off the ground, means for actuating the aforesaid means, a slidably mounted bar between said rod and the adjacent axle of the vehicle, and an operable connection between the actuating means and said bar to move said bar in one direction and throw the actuating means out of operation at a predetermined time.

15. In a vehicle, elevating and raising means connected to the vehicle and arranged under the body of the vehicle and operable to raise and lower the vehicle from off the ground, means for actuating the aforesaid means, a slidably mounted bar arranged under the body of the vehicle, an operable connection under the body of the vehicle between the actuating means and said bar to move said bar in one direction and throw the actuating means out of operation at a predetermined time, means whereby said bar may be shifted in the opposite direction to throw said actuating means into operation, and means to normally hold said bar either in a neutral position or at either limit of its movements in opposite directions.

16. In a vehicle, means arranged under the body of the vehicle adjacent each end of the vehicle and operable for raising and lowering the vehicle, each means including a gear mechanism, a shaft under the body of the vehicle connecting the gear mechanisms of each said means, means for driving said gear mechanisms to lower raising and lowering means at the ends of the vehicle, and means under the body of the vehicle connected with each latter means for effecting a reversal of the respective gear mechanism to effect a raising of the respective first mentioned means whereby either of said first mentioned means may be raised or lowered or both simultaneously.

17. In a vehicle, means arranged adjacent each end of the vehicle off the ground operable for raising and lowering the vehicles, each means including a gear mechanism, a shaft connecting the gear mechanisms of each said means, means for driving said gear mechanisms to lower raising and lowering means at the ends of the vehicle, means connected with each latter means for effecting a reversal of the respective gear mechanism to effect a raising of the respective first mentioned means whereby either of said first mentioned means may be raised or lowered or both simultaneously, a bar under the body of the vehicle adjacent each of the first mentioned means, and an operative connection between each bar and the respective first mentioned means whereby the lowering of the first means may be arrested.

18. In a vehicle, elevating and raising means connected to the vehicle under the body of the vehicle and operable to raise and lower the vehicle from off the ground, said means including a gear mechanism, a bar mounted under the body of the vehicle for longitudinal movement adjacent said means, means between the aforesaid means and said bar to throw the gear mechanism out of operation, and hand-operated means whereby the gear mechanism may be thrown into operation.

19. In a vehicle, elevating and raising means connected to the vehicle under the body of the vehicle and operable to raise and lower the vehicle from off the ground, said means including a gear mechanism, a bar mounted under the body of the vehicle for longitudinal movement adjacent said means, means between the aforesaid means and said bar to throw the gear mechanism out of operation, means for holding the gear mechanism out of operation, and hand-operated means whereby the gear mechanism may be restored to operative condition.

20. In a vehicle, a rod rotatably supported by the vehicle under the body thereof and having portions reversely threaded, members mounted upon the reversely threaded portions of the rod for movement thereon upon rotation of the rod, vehicle elevating and supporting means operatively connected to the aforesaid members and normally carried in an elevated position under the body of the vehicle, means to rotate the rod to move said members and lower the elevating and supporting means into engagement with the ground to raise the vehicle, and strikers arranged under the body of the vehicle to be engaged by one of said members upon the reversely threaded rod, one of said members being adjustable.

21. In a vehicle, means carried by the vehicle operable to raise and lower the vehicle, means to actuate the raising and lowering means, a bar slidable under the body in the direction of its length, and means whereby upon actuation of the raising and lowering means to a predetermined degree the bar may be moved in the direction of its length to automatically throw said actuating means out of operation.

22. In a vehicle, movable jacks, a transverse rod operatively connected to said jacks, a longitudinal shaft adapted to have power applied thereto, a gear wheel fixed on the longitudinal shaft, companion gear wheels, one at each side of the gear wheel of the longitudinal shaft, splined on the said rod, a slidable bar having connection with said companion gear wheels and provided with a slot and recesses, a stop extending into the slot and adapted to engage any one of the said recesses, means for yieldably holding the stop in the required recess, and operating means for the slidable bar.

In testimony whereof I have hereunto signed my name.

FRED. LIONEL RAPSON.